United States Patent
Kubota (10) Patent No.: US 9,810,769 B2
(45) Date of Patent: Nov. 7, 2017

(54) DEVICE AND METHOD FOR DISPLAYING INFORMATION, RADAR APPARATUS

(75) Inventor: Yugo Kubota, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 1066 days.

(21) Appl. No.: 13/619,342

(22) Filed: Sep. 14, 2012

(65) Prior Publication Data

US 2013/0076561 A1    Mar. 28, 2013

(30) Foreign Application Priority Data

Sep. 22, 2011    (JP) ................................. 2011-207411

(51) Int. Cl.
G01S 13/00    (2006.01)
G01S 7/06    (2006.01)
G01S 7/14    (2006.01)
G01S 7/292    (2006.01)

(52) U.S. Cl.
CPC ............... *G01S 7/062* (2013.01); *G01S 7/14* (2013.01); *G01S 7/292* (2013.01)

(58) Field of Classification Search
CPC ............. G01S 7/062; G01S 7/14; G01S 7/292
See application file for complete search history.

(56) References Cited

U.S. PATENT DOCUMENTS

| 4,071,843 A * | 1/1978 | Marien ..................... G01S 1/02 342/181 |
| 4,179,681 A | 12/1979 | Zehner et al. | |

| 2008/0169974 A1* | 7/2008 | Fujikawa .............. G01S 13/106 342/179 |
| 2010/0039513 A1* | 2/2010 | Glickman ................ G06K 9/00 348/143 |
| 2010/0321231 A1 | 12/2010 | Nakahama | |

FOREIGN PATENT DOCUMENTS

| CN | 201788279 U | 4/2011 |
| JP | 10-123231 A | 5/1998 |
| JP | 2001-272456 A | 10/2001 |
| JP | 2002-116249 A | 4/2002 |
| JP | 3680265 B2 | 8/2005 |
| JP | 2009-0158433 A | 3/2009 |
| JP | 2011-2425 A | 1/2011 |

OTHER PUBLICATIONS

Office Action of the corresponding Japanese Patent Application No. 2011-207411, dated May 21, 2015.
Office Action of the corresponding Chinese Patent Application No. 20120182203.8, dated Dec. 31, 2015.

* cited by examiner

*Primary Examiner* — Insa Sadio
(74) *Attorney, Agent, or Firm* — Global IP Counselors, LLP (57) ABSTRACT

This disclosure provides an information display device, which includes a sensor signal acquirer for acquiring a sensor signal indicating a content detected by a sensor, a signal processor for performing first signal processing and second signal processing different from the first signal processing, on the sensor signal, and a display unit for displaying on a screen image, first information of the sensor signal after the first signal processing, and partial information of second information of the sensor signal after the second signal processing in a different display mode from the first information, the partial information being different from the first information.

14 Claims, 10 Drawing Sheets

FIG. 1

■ ECHOES OBTAINED THROUGH FIRST SIGNAL PROCESSING (VARIOUS COLORS)

▨ ECHOES OBTAINED THROUGH SECOND SIGNAL PROCESSING (SINGLE COLOR)

CHART SHOWING SEA SURFACE CLUTTER REMOVING CURVE AT EXCESSIVE LEVEL

FIG. 10A (Conventional Art)

CHART SHOWING ECHO SIGNALS AFTER GAIN ADJUSTMENT PROCESSING

FIG. 10B (Conventional Art)

DEVICE AND METHOD FOR DISPLAYING INFORMATION, RADAR APPARATUS

CROSS-REFERENCE TO RELATED APPLICATION(S)

The application claims priority under 35 U.S.C. §119 to Japanese Patent Application No. 2011-207411, which was filed on Sep. 22, 2011 the entire disclosure of which is hereby incorporated by reference.

TECHNICAL FIELD

The present invention relates to an information display device for displaying information detected by a sensor.

BACKGROUND OF THE INVENTION

Generally, antennas provided to radar apparatuses receive not only an echo (reflection wave) from a target object or a land, but also an echo from a wave surface (sea surface clutter) and an echo from rain or snow (rain-and-snow clutter). Therefore, in order to suppress (remove) such an unnecessary echo, conventionally, processing of subtracting a predetermined value from a signal level of the echo (gain adjustment processing) has been performed.

Figure 8A:
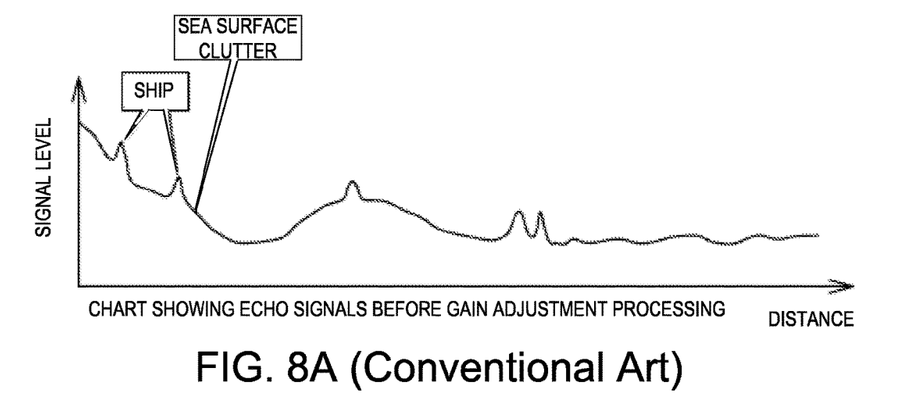
FIGS. 8A to 8C are charts showing how the sea surface clutter is suppressed by appropriate gain adjustment processing.
Figure 8B:
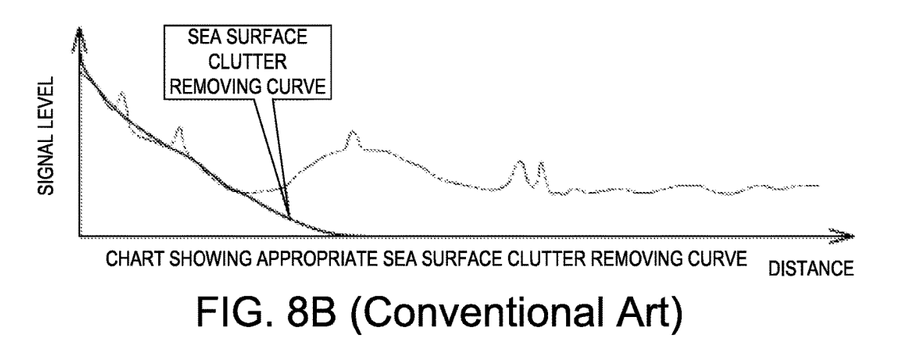
Figure 8C:
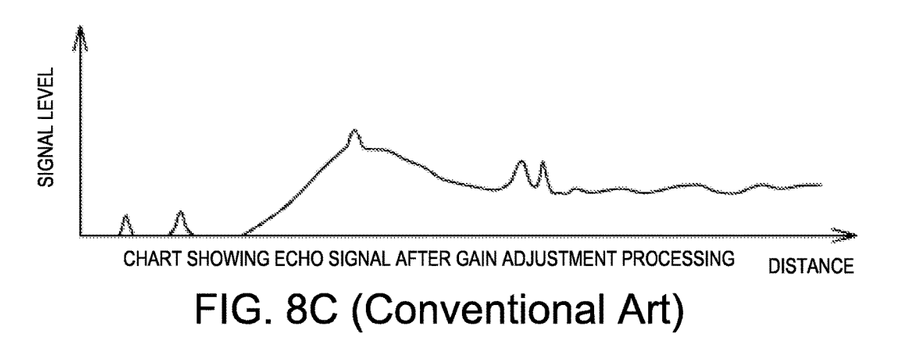
Figure 9A:
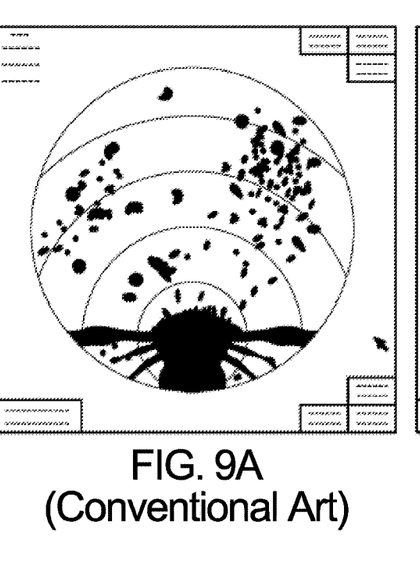
FIGS. 9A to 9C are views showing display screens when the gain adjustment processing is performed at different levels, respectively.
Figure 9B:
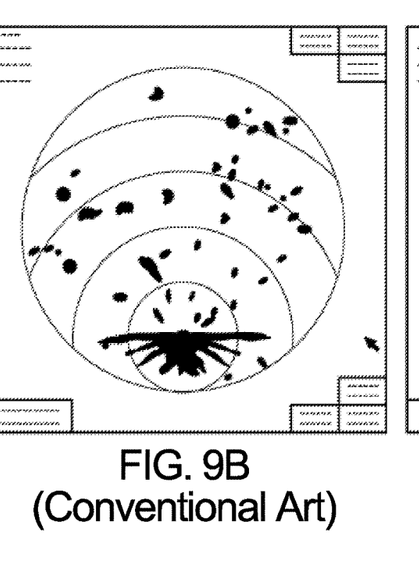
Figure 9C:
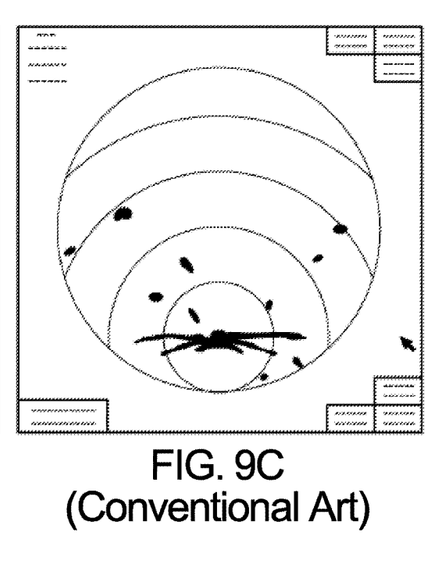

Hereinafter, the gain adjustment processing for suppressing the sea surface clutter is exemplary explained with reference to FIGS. 8A to 9C. FIGS. 8A to 8C are charts showing how the sea surface clutter is suppressed by appropriate gain adjustment processing. FIGS. 9A to 9C are views showing display screens when the gain adjustment processing is performed at different levels, respectively.

FIG. 8A is a chart showing echo signals (including the sea surface clutter) before the gain adjustment processing. As shown in FIG. 8A, the sea surface clutter generally has a property in which the signal level thereof is high at a position close to a radar antenna, but it lowers rapidly as it is further distant from the radar antenna. In consideration of this property, there has been a radar apparatus set with a curve for lowering a value of the signal level to be removed (sea surface clutter removing curve). The signal level is lowered more as the sea surface clutter is further distant from the antenna (see FIG. 8B). By subtracting the value obtained from the sea surface clutter removing curve an echo signal having a level indicating only a ship can be extracted from the echo signal before the gain adjustment processing (the sea surface clutter can be suppressed) (see FIG. 8C).

Similarly, by further suppressing other unnecessary echoes, such as the rain-and-snow clutter, a radar image in which the unnecessary echoes are appropriately suppressed (FIG. 9B) can be created. In this manner, necessary echoes can be displayed to be viewed easier comparing to a radar image created without the gain adjustment processing (FIG. 9A).

JP2011-002425A discloses a radar apparatus having a configuration for effectively removing the rain-and-snow clutter. Based on an echo signal received by the radar apparatus, a section determiner provided to the radar apparatus determines whether a distance range where the echo exists is in "a land/target-object section" or "a rain-and-snow/noise section." Further, the radar apparatus suppresses the rain-and-snow clutter within the distance range determined as "the rain-and-snow/noise section", by using a value determined according to the echo signal within the distance range.

Note that, the radar apparatus disclosed in JP2011-002425A also has the configuration of displaying the range determined as "the rain-and-snow/noise section" filled in a translucent color.

Figure 10A:
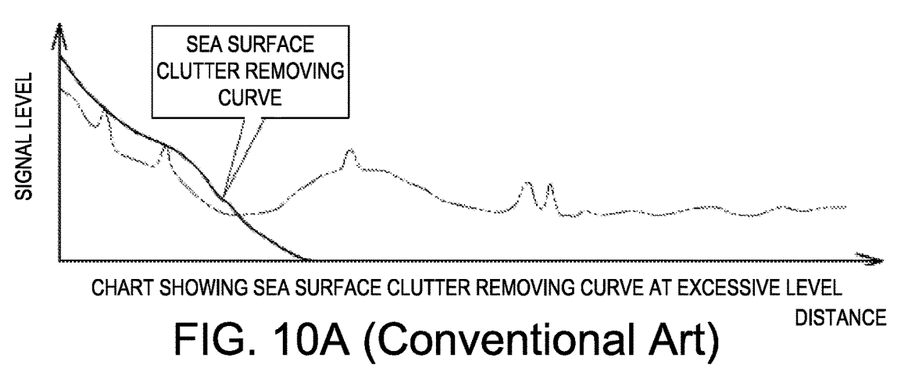
FIGS. 10A and 10B are charts showing a case where even an echo indicating a ship is suppressed by excessive gain adjustment processing.
Figure 10B:
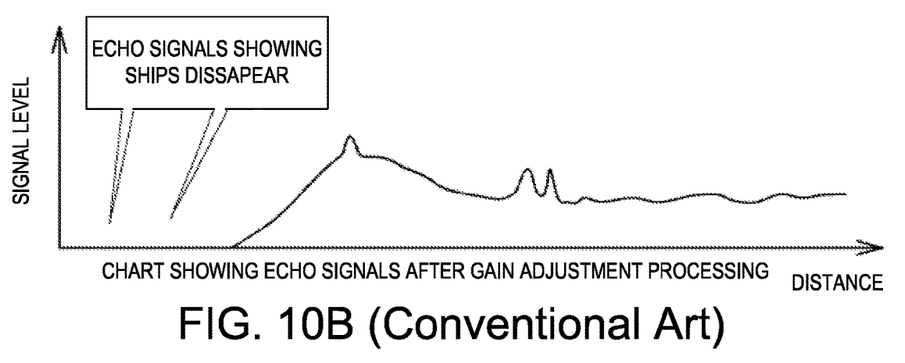

Meanwhile, it is not easy to set the sea surface clutter removing curve for the gain adjustment processing. For example, when the value of the sea surface clutter removing curve is excessively high as shown in the chart of FIG. 10A, even the echo signal indicating the ship is suppressed (FIG. 10B). As a result, a radar image in which necessary information is also suppressed is created (FIG. 9C).

Therefore, when the radar image is displayed with hardly anything, an operator referring to the radar image may be confused whether the echo indicating the ship is suppressed by the signal processing or the ship itself does not exist. In this case, the operator needs to set the level of the gain adjustment processing to perform the processing again so as to confirm the existence of the ship.

This situation has been a common problem for not only ship radar apparatuses but various kinds of equipments with the possibility of contents detected by a sensor being suppressed through performing signal processing thereon.

SUMMARY OF THE INVENTION

The present invention is made in view of the above situation, and provides an information display device for displaying information obtained through performing predetermined signal processing on contents detected by a sensor, in which the information is displayed so that an operator can grasp whether a detection target is not displayed only because of the predetermined signal processing or it originally does not exist.

According to one aspect of the invention, an information display device, which includes a sensor signal acquirer for acquiring a sensor signal indicating a content detected by a sensor, a signal processor for performing first signal processing and second signal processing different from the first signal processing, on the sensor signal, and a display unit for displaying on a screen image, first information of the sensor signal after the first signal processing, and partial information of second information of the sensor signal after the second signal processing in a different display mode from the first information, the partial information being different from the first information.

In this manner, the main partial sensor image (first information) and the supplemental partial sensor image (second information) can be displayed simultaneously. Therefore, even if the first information is partially suppressed excessively by performing the first signal processing to remove, for example, noises, a part of the second information can be displayed for the suppressed part of the first information instead. Therefore, for example, when the detection target is not displayed on the screen image, it can be prevented that an operator is confused whether the ship is not displayed only because of the signal processing or it originally does not exist.

The first information may be displayed with gradation in color, and the second information is displayed with no gradation in color.

In this manner, the contents of the first information (e.g., intensity of a measured value) can easily seen and the second information can easily be grasped from all the information. Especially, by using a display mode of not excessively emphasizing the second information (e.g., hatching), the second information can be instinctively grasped that it is the supplemental information.

A display color of the first information may be different from a display color of the second information.

In this manner, the first and second information can be discriminated with such a simple configuration. Especially, by using a display color that does not excessively emphasize, for the second information, the second information can be instinctively grasped that it is the supplemental information.

The first signal processing may correspond to the second signal processing with additional processing.

In this manner, even if the first information is partially suppressed excessively by the additional signal processing, a part of the second information can be displayed for the suppressed part of the first information instead. Therefore, for example, high level noise suppressing processing can be performed while referring to the detection target of the sensor.

The similar kind of signal processing may be used in the first signal processing and the second signal processing, and parameters used in the first signal processing and the second signal processing may be different from each other.

In this manner, if the signal processor performs the noise suppressing processing, by using the different parameters between the first and second signal processing, even when a noise is sufficiently suppressed and the first information partially disappears from the screen image, the disappeared information can be displayed as the second information.

The similar kind of the signal processing may be gain adjust processing.

In this manner, even if a signal level of the noise and a signal level of the detection target are close and the gain adjustment processing is performed to lower the levels, it can be prevented that the detection target disappears from the screen image.

The similar kind of the signal processing may be scan-to-scan correlation processing.

In this manner, even when the scan-to-scan correlation processing is performed to lower the signal level of the detection target in rapid movement, it can be prevented that the detection target disappears from the screen image.

One of the parameters of the first and second signal processing may be adjusted automatically, and the other parameter may be adjusted based on a value set by an operator.

In this manner, the signal processing performed through the operation by the operator and the signal processing adjusted automatically can be supplemented mutually.

One of the parameters of the first and second signal processing may be a value obtained by either one of increasing and reducing the other parameter by a predetermined amount.

In this manner, for example, the detection target can be displayed as the second information before it disappears from the first information by adjusting the parameters. Therefore, the parameters can be set again before the display target completely disappears from the screen image.

According to another aspect of the invention, a radar apparatus is provided, which includes the information display device of any of the other aspects, and a radar antenna serving as the sensor.

When the radar apparatus for detecting a movable body is used, because it is desired for the operator to surely grasp whether the movable body is not displayed on the screen image because of the signal processing or it originally does not exist, the above configuration can particularly effectively exert an effect of the invention that the operator can grasp the situation.

According to further another aspect of the invention, a sonar apparatus is provided, which includes the information display device of any of the other aspects, and a sonic wave reception device serving as the sensor.

In this manner, the above effect of the invention can be exerted by the sonar apparatus.

According to still another aspect of the invention, a method of displaying information is provided, which includes acquiring a sensor signal indicating a content detected by a sensor, performing first signal processing and second signal processing different from the first signal processing, on the sensor signal, and displaying on a screen image, first information of the sensor signal after the first signal processing, and partial information of second information of the sensor signal after the second signal processing in a different display mode from the first information, the partial information being different from the first information.

In this manner, the main partial sensor image (first information) and the supplemental partial sensor image (second information) can be displayed simultaneously. Therefore, even if the first information is partially suppressed excessively by performing the first signal processing to remove, for example, noises, a part of the second information can be displayed for the suppressed part of the first information instead. Therefore, for example, when the detection target is not displayed on the screen image, it can be prevented that an operator is confused whether the ship is not displayed only because of the signal processing or it originally does not exist.

BRIEF DESCRIPTION OF THE DRAWINGS

The present disclosure is illustrated by way of example and not by way of limitation in the figures of the accompanying drawings, in which the like reference numeral indicate like elements and in which.

DETAILED DESCRIPTION

Figure 1:
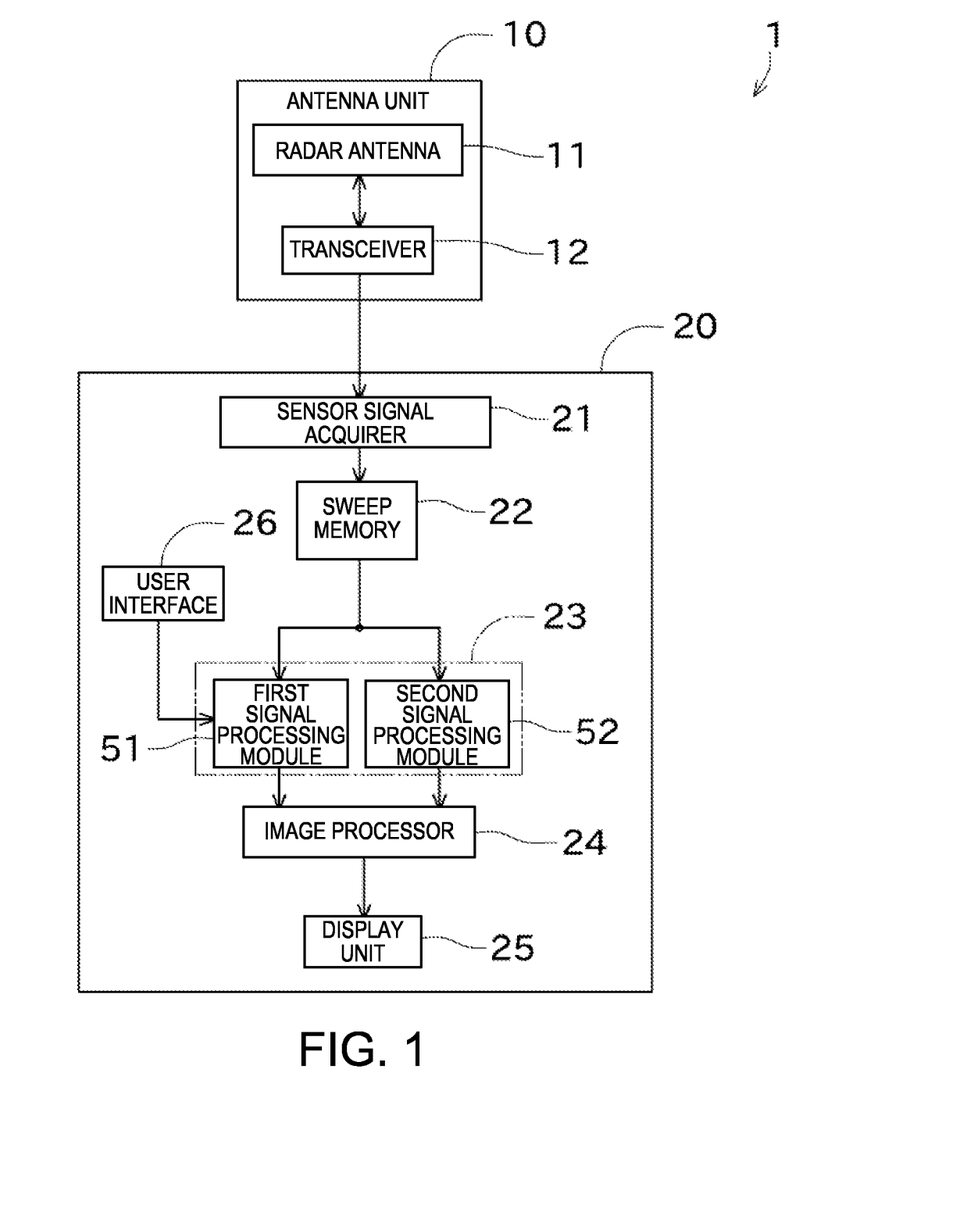
FIG. 1 is a block diagram of a radar apparatus according to an embodiment of the present invention.
Figure 2A:
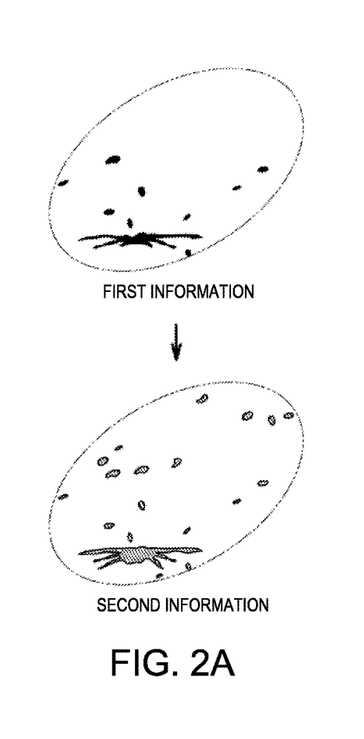
FIG. 2A is views showing first information and second information, respectively.
Figure 2B:
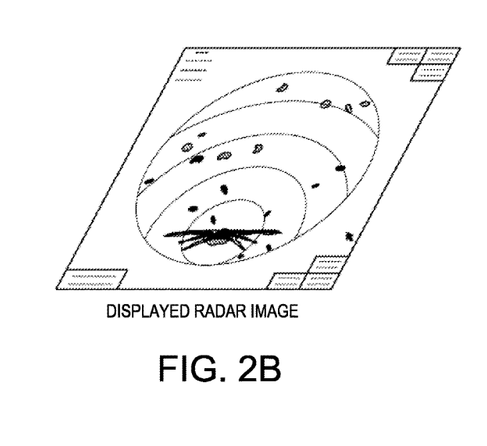
FIG. 2B is a view showing a sensor image created from the information.
Figure 3:
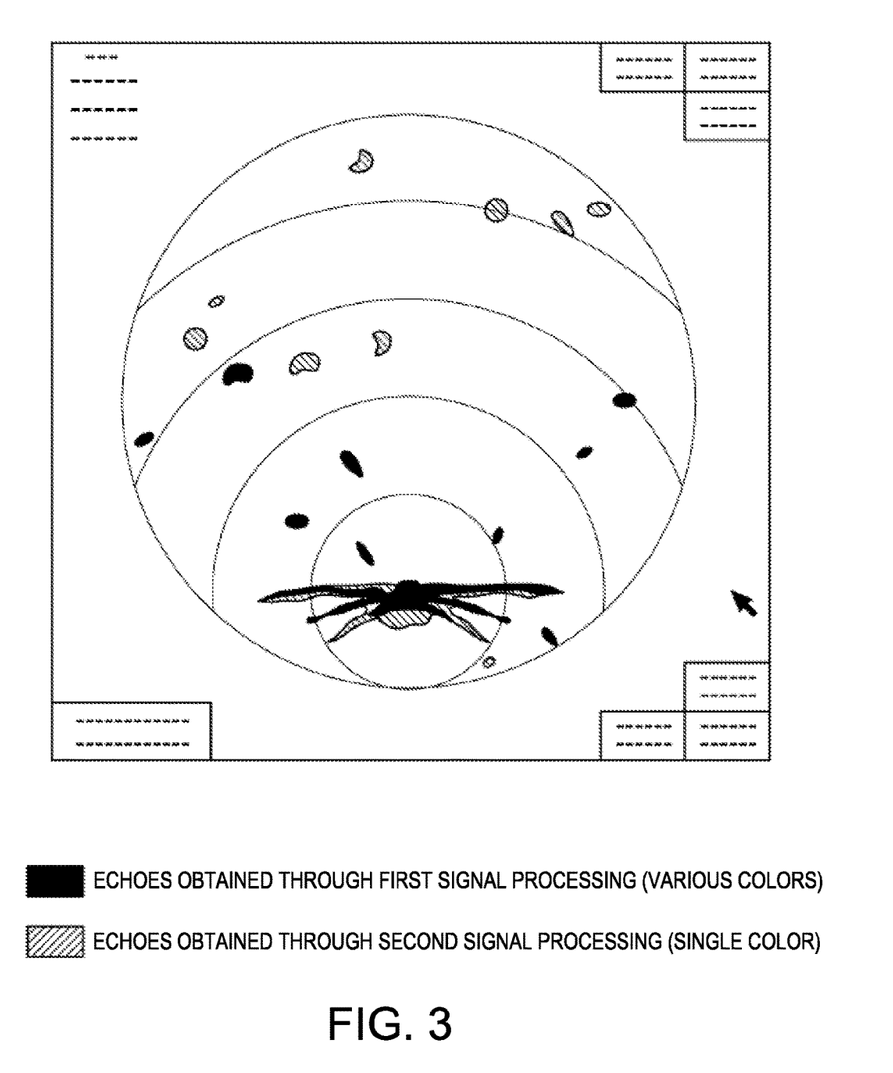
FIG. 3 is a view showing a display example of the sensor image.

Next, an embodiment of the present invention is described with reference to the appended drawings. FIG. 1 is a block diagram of a radar apparatus 1 according to this embodiment. FIG. 2A is views showing first information and second information, respectively, and FIG. 2B is a view showing a sensor image created from the information. FIG. 3 is a view showing a display example of the sensor image.

The radar apparatus 1 is a ship radar to be provided on a ship (hereinafter, may be referred to as "the ship concerned" or may be simply referred to as "the ship"), such as a fishing boat, and is generally used to detect a target object, such as another ship. As shown in FIG. 1, the radar apparatus 1 includes an antenna unit 10 and a radar instruction device 20 (image display device).

The antenna unit 10 is attached to a predetermined position in the ship, and has a radar antenna 11 (sensor) and a transceiver 12.

The radar antenna 11 transmits a pulse-shaped electric wave having a strong directivity and receives an echo (reflection wave) from the target object. Further, the radar antenna 11 measures a time length between the transmission of the pulse-shaped electric wave and the reception of its echo, and thereby, a distance from the ship to the target object can be grasped. Moreover, the radar antenna 11 can revolve horizontally over 360°, and repeatedly transmit and receive the electric wave while horizontally changing a transmission direction of the electric wave (while changing a facing direction of the radar antenna 11). With the above configuration, the detection of the target object can be performed horizontally over 360° centering on the ship. Hereinafter, an operation between the transmission of the pulse-shaped electric wave and the next transmission thereof may be referred to as "the sweep."

Note that, either one of a CW (continuous wave) radar and a pulse doppler radar may be used alternative to the pulse radar. Further, alternative to the radar apparatus of this embodiment, a radar apparatus having a configuration in which the radar antenna does not revolve may be used. For example, with either one of a radar apparatus having a configuration with antenna elements in the entire circumferential direction and a radar apparatus for detecting only a particular direction (e.g., forward), the radar antenna is not required to revolve for detecting around the ship.

The transceiver 12 samples an echo signal received by the radar antenna 11 so as to be digitized, and outputs the digitalized echo signal (sensor signal) to the radar instruction device 20.

The radar instruction device 20 includes a sensor signal acquirer 21, a sweep memory 22, a signal processor 23, an image processor 24, a display unit 25, and a user interface 26.

The sensor signal acquirer 21 is an interface for communicating with the antenna unit 10. The sensor signal acquirer 21 acquires the sensor signal indicating a detection result from the radar antenna 11 and outputs it to the sweep memory 22.

The sweep memory 22 is a buffer memory that can store sensor signals for one sweep in real time. The sweep memory 22 is stored with the sensor signals sampled during one sweep, in a chronological order. Therefore, based on a read address of when the sensor signal is read out from the sweep memory 22, the distance to the target object (source of the echo) corresponding to the sensor signal can be obtained. Further, an azimuth sensor (not illustrated) is attached to the radar antenna 11, and a detection result from the azimuth sensor is also transmitted to the sweep memory 22 via the sensor signal acquirer 21. Therefore, when the sensor signal is read out from the sweep memory 22, a position of the target object corresponding to the sensor signal can be obtained.

The signal processor 23 performs predetermined signal processing (first signal processing and second signal processing) based on the sensor signal inputted from the sweep memory 22. The signal processor 23 is constituted with a first signal processing module 51 and a second signal processing module 52. In this embodiment, both the first signal processing module 51 and the second signal processing module 52 perform gain adjustment processing.

The first signal processing module 51 performs the gain adjustment processing on the echo signal by using a gain adjustment parameter according to an operation by an operator, and creates a first radar image (first information) based on the adjusted echo signal (see the upper view of FIG. 2A). Although the first information is displayed in a single color in the upper view of FIG. 2A, actually a gradation of the color is changed in the display according to an echo signal level. Note that, any arbitrary color may be used in displaying the first information. The first information created by the first signal processing module 51 is outputted to the image processor 24.

The second signal processing module 52 calculates the gain adjustment parameter based on the sensor signals acquired by the sensor signal acquirer 21 and performs the gain adjustment processing by using the calculated gain adjustment parameter. Further, the second signal processing module 52 creates a second radar image (second information) based on the adjusted echo signal (see the lower view of FIG. 2A). Unlikely to the first information, the gradation of a display color of the second information does not change. That is, the second signal processing module 52 creates the second information based on whether the echo signal level is higher than a predetermined threshold. Note that, the threshold may be set to change according to the distance from the ship to the corresponding target object. The second information created by the second signal processing module 52 is outputted to the image processor 24. Processing of creating the second information by the second signal processing module 52 is described below in detail.

The image processor 24 creates a combined sensor image (hereinafter, may simply be referred to as "the sensor image"). Here, the image processor 24 creates the sensor image by superimposing the first information on the second information (see FIG. 2B). That is, the image processor 24 creates the sensor image by combining the first information and a part of the second information that is different from the first information (the part that does not overlap with the first information). The image processor 24 outputs the thus created sensor image to the display unit 25.

The display unit 25 is a liquid crystal display that can display in full color. As shown in FIG. 3, the display unit 25 displays the sensor image on a display screen.

The user interface 26 includes operation keys and an operation knob. The operator operates the user interface 26 to be able to perform various operations and instructions to the components such as the radar instruction device 20. Especially, in this embodiment, the operator can specify a set value of the gain adjustment processing which is performed by the first signal processing module 51, through operating the user interface 26. The first signal processing module 51 changes the parameter for the gain adjustment processing based on the set value.

As described above, the display unit 25 can simultaneously display the main radar image (first information) and the supplemental radar image (second information). In this manner, even if the operator operates the user interface 26 to set a comparatively high gain adjustment parameter and, thereby, the echo indicating, for example, the ship disappears from the display screen, the echo (i.e., a potential echo excluded from the first information) can be displayed as the second information. Therefore, it can be prevented that the operator overlooks the echo.

Next, the gain adjustment processing performed by the second signal processing module 52 so as to determine the existence of the target object is explained with reference to FIGS. 4A to 5B.

Figure 4A:
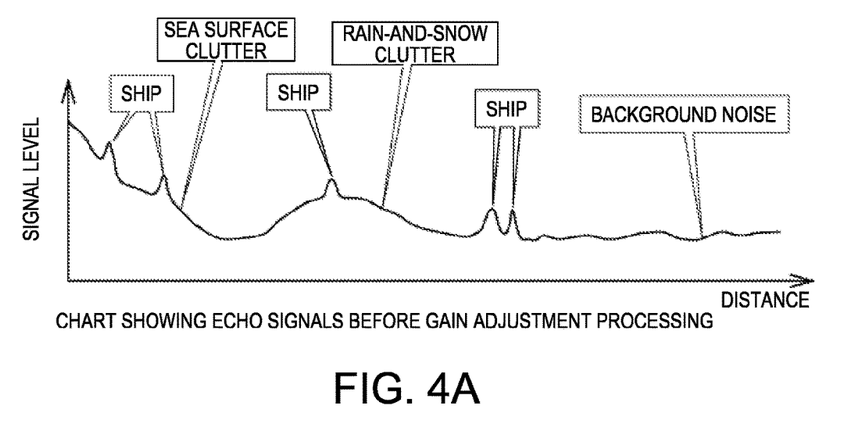
FIG. 4A is a chart showing echo signals before gain adjustment processing by a second signal processing module.

FIG. 4A is a chart showing the echo signals (sensor signals) before the gain adjustment processing. As shown in FIG. 4A, the echo signals include, in addition to the echo signals from the other ships, the echo signals from a wave surface (sea surface clutter), from rain and/or snow (rain-and-snow clutter), and background noises. Note that, among countless number of methods of performing the gain adjustment processing by the second signal processing module 52, in the description below, parameters used in case 1: gain adjustment processing of removing the background noises, case 2: gain adjustment processing of removing the sea surface clutter and the background noises, and case 3: gain adjustment processing of removing the sea surface clutter, the rain-and-snow clutter, and the background noises are explained, respectively.

Figure 4B:
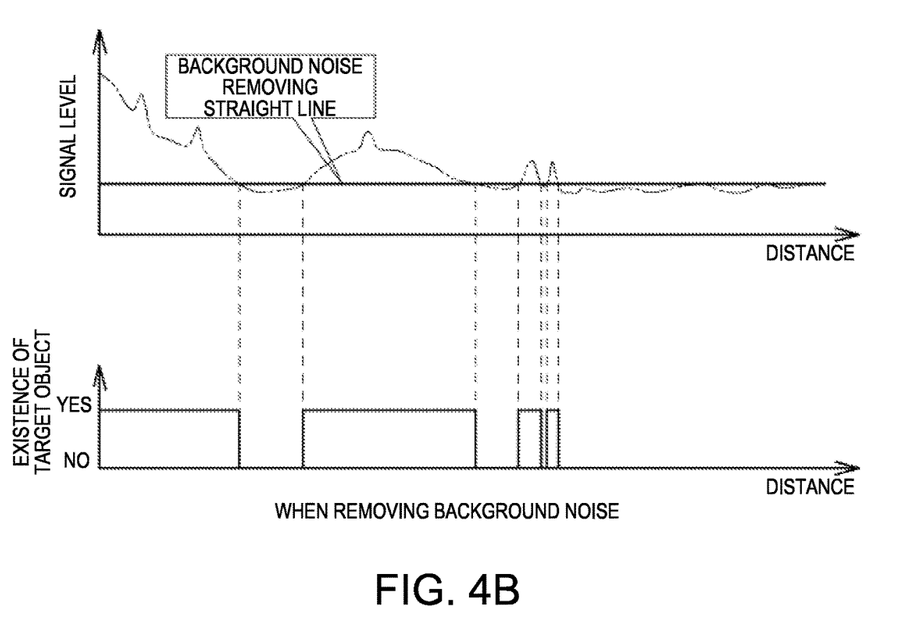
FIG. 4B is charts explaining the gain adjustment processing performed by the second signal processing module in a case of removing a background noise.

FIG. 4B shows a background noise removing straight line for removing the background noises. The background noise removing straight line is obtained by averaging the signal levels of the echo signals from far in distance. First, the second signal processing module 52 subtracts a value obtained from the background noise removing straight line, from each of the signal level of the received echo signal. Next, the second signal processing module 52 determines that the target object (e.g., ship) exists in an area where the echo signal level is still left (i.e., the signal level is above 0) as a result of the subtraction. As above, the second signal processing module 52 determines the existence of the target object by removing the background noises in the case of FIG. 4B.

Figure 5A:
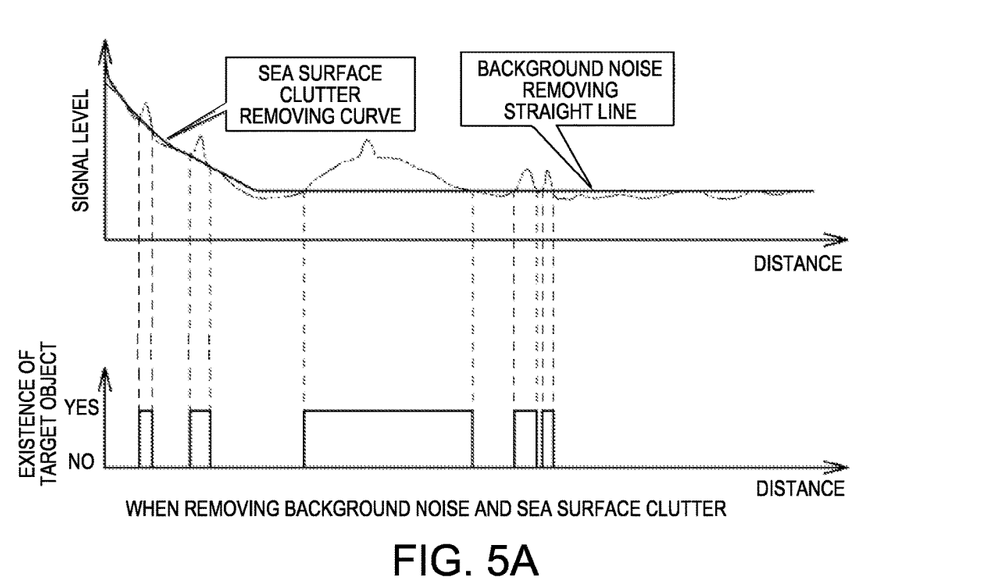
FIG. 5A is charts explaining the gain adjustment processing performed by the second signal processing module in a case of removing the background noise and a sea surface clutter, and 5B is charts explaining the gain adjustment processing performed by the second signal processing module in a case of removing the background noise, the sea surface clutter, and the rain-and-snow clutter.

FIG. 5A shows a sea surface clutter removing curve for removing the sea surface clutter in addition to the above background noise removing straight line. A sea surface clutter generally has a property in which the signal level thereof is high at a location close to the radar antenna 11, but it lowers rapidly as it is further distant therefrom. Therefore, the sea surface clutter removing curve is obtained through forming an area according to the distance from the radar antenna 11 and averaging the echo signal levels in the area. Among the received echo signals, the second signal processing module 52 subtracts a value obtained from the sea surface clutter removing curve, from each of the signal levels of the echo signals in the area where the sea surface clutter is dominant, and subtracts the value obtained from the background noise removing straight line, from the signal levels of rest of the other echo signals. Next, the second signal processing module 52 determines that the target object (e.g., ship) exists in an area where the echo signal level is still left as a result of the subtractions. As above, the second signal processing module 52 determines the existence of the target object by removing the sea surface clutter and the background noises.

Figure 5B:
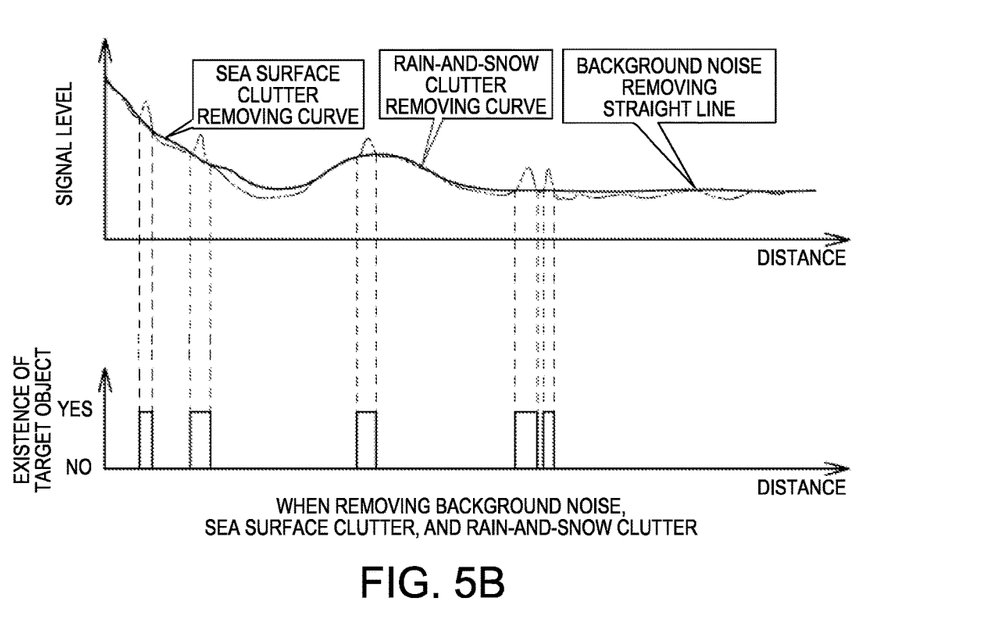

FIG. 5B shows a rain-and-snow clutter removing curve for removing the rain-and-snow clutter in addition to the above sea surface clutter removing curve and background noise removing straight line. Rain-and-snow clutter is generally influenced also by weather, on top of the distance from the radar antenna 11. Therefore, in the gain adjustment processing of this case, the processing of obtaining the sea surface clutter removing curve is also performed for a location far from the radar antenna 11 in addition to the location close thereto. Thus, the curves and the straight line with which the sea surface clutter, the rain-and-snow clutter, and the background noises can be removed can be formed. The second signal processing module 52 subtracts the values obtained from the above curves and straight line from the signal levels of the echo signals respectively and, for an area where the signal level is still left, the second processing module 52 determines that the target object (i.e., ship) exits. In this manner, the second signal processing module 52 determines the existence of the target object by removing the sea surface clutter, the rain-and-snow clutter, and the background noises.

By obtaining the gain adjustment parameter based on the received echo signals and subtracting one or more of the values of the parameter from the signal levels of the echo signals respectively, the second signal processing module 52 derives a satisfactory valid result about the existence of the target object. Therefore, the display screen of the display unit 25 can keep displaying the valid result as the supplemental radar image.

Note that, alternative to the above configuration, the gain adjustment parameter of the second signal processing module 52 may be set through the operation by the operator, and the gain adjustment parameter of the first signal processing module 51 may be calculated automatically. With this configuration, the main radar image (first information) is created by using the automatically calculated gain adjustment parameter; therefore, this is suitable for a case where the gain adjustment parameter can be calculated accurately.

Figure 6:
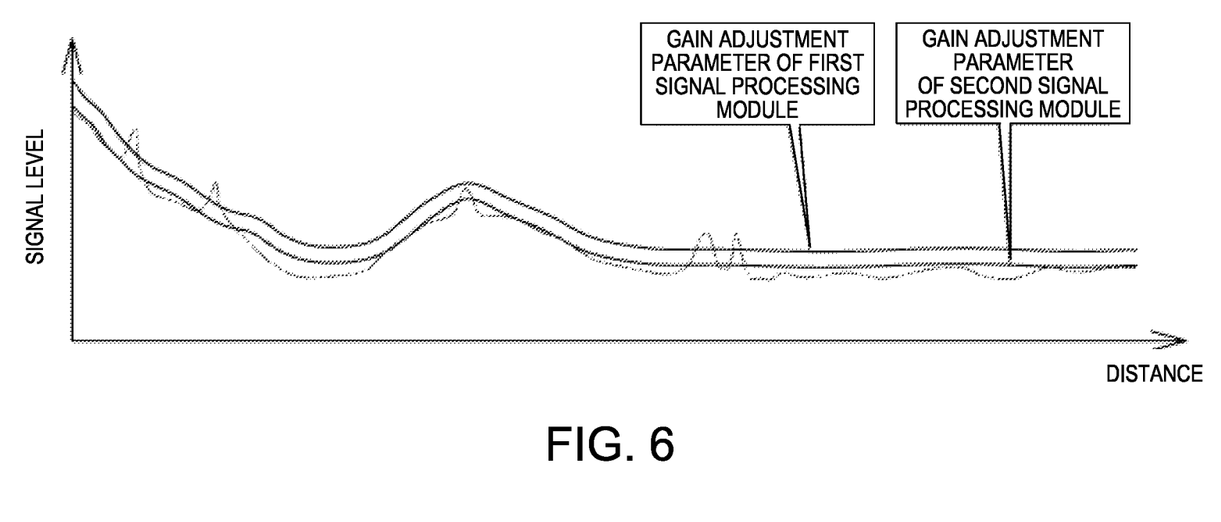
FIG. 6 is a chart explaining another example of the gain adjustment processing performed by the second signal processing module.

A further alternative configuration includes, as shown in FIG. 6, setting the gain adjustment parameter of the second signal processing module 52 to a value smaller than the gain adjustment parameter of the first signal processing module 51 by a predetermined value. With this configuration, when an echo is excluded from the first information and disappears from the display screen, the echo is displayed as the second information instead. Therefore, for example, the gain adjustment parameter of the first signal processing module 51 may be readjusted before the echo disappears from the display screen, so that the echo remains on the display screen.

Thus, the method of setting the gain adjustment parameters of the first and second signal processing modules 51 and 52 is arbitrary as long as the gain adjustment parameter differs therebetween.

Figure 7A:
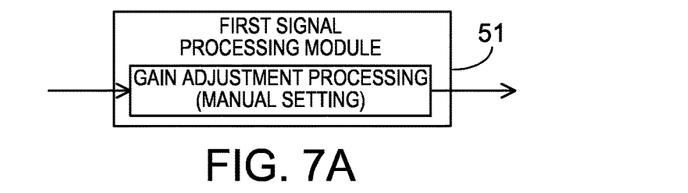
FIGS. 7A to 7F are block diagrams showing examples of processing performed by a first signal processing module and the second signal processing module.
Figure 7B:
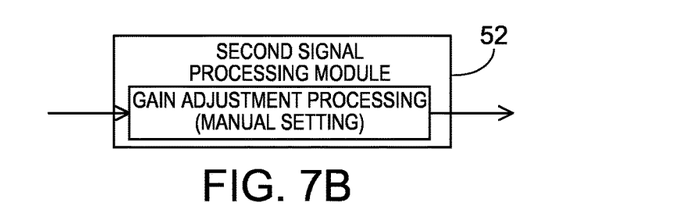
Figure 7C:
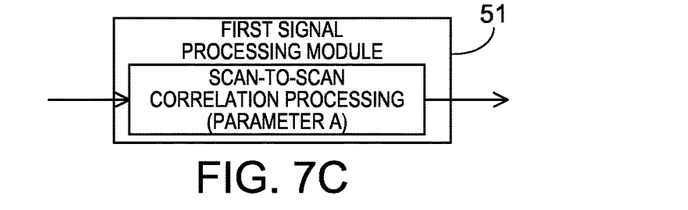
Figure 7D:
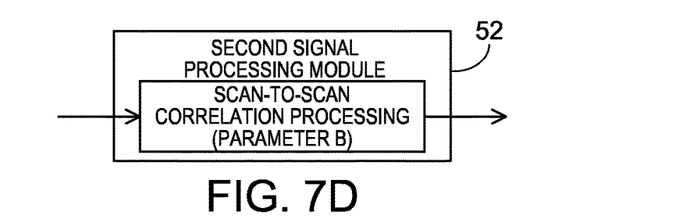

Further, in the above configuration, as shown in FIGS. 7A and 7B, both of the first and second signal processing modules 51 and 52 perform the gain adjustment processing; however, as shown in FIGS. 7C and 7D, scan-to-scan correlation processing may be performed alternative (or in addition) to the gain adjustment processing.

The scan-to-scan correlation processing is for correlating a latest echo signal with a previous echo signal so as to suppress a signal of which a signal level randomly varies in term of time (signal having a high correlativity with the previous signal) while remaining a signal detected stably in term of time (signal having a low correlativity with the previous signal). For example, echo signals indicating the other ship, a buoy, and a land are generally detected stably in term of time, and on the other hand, echo signals based on the sea surface clutter generally has a signal level that randomly varies in term of time. Therefore, by performing the scan-to-scan correlation processing on the echo signals, only the signals based on the sea surface clutter are suppressed. However, for example, if the other ship is in rapid movement, the echo from the other ship is detected at a different location in every scan, and the signal level of the echo appears to be unstable. As a result, the echo from the rapidly moving target object may be suppressed.

Note that, by raising the parameter to be used in the scan-to-scan correlation processing, the signal of which the signal level randomly varies in term of time can correspondingly be suppressed more. In the configuration shown in FIGS. 7C and 7D, the parameter to be used in the scan-to-scan correlation processing may be differed between the first and second signal processing modules 51 and 52. For example, the parameter to be used in the scan-to-scan correlation processing performed by the second signal processing module 52 is lowered than that for the first signal processing module 51 by a predetermined amount so that the echo closest to the lowered parameter is displayed preferentially, and thereby, when the target object in rapid movement is excluded from the first information and disappears from the display screen, the target object is displayed as the second information instead. Therefore, for example, the parameter may be readjusted before the echo disappears from the display screen.

Figure 7E:
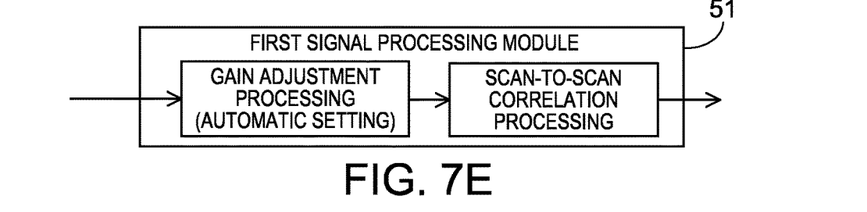
Figure 7F:
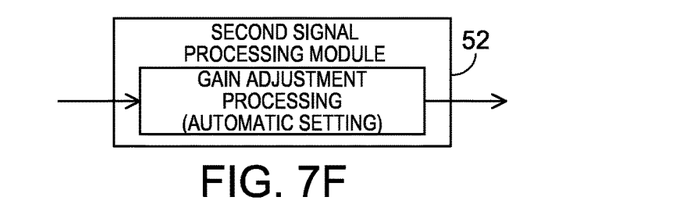

Further, the signal processing performed by the first and second signal processing modules 51 and 52 may not be the similar kind. For example, as shown in FIGS. 7E and 7F, the first signal processing module 51 may perform the gain adjustment processing and the scan-to-scan correlation processing, and the second signal processing module 52 may perform only the gain adjustment processing. In other words, the processing performed by the first signal processing module 51 may be expressed as the processing performed by the second signal processing module 52 with the additional processing.

As above, the first signal processing performed by the first signal processing module 51 and the second signal processing performed by the second signal processing module 52 may be arbitrary as long as at least one of the kind and parameter of the signal processing is different therebetween.

As explained above, the radar instruction device 20 includes the sensor signal acquirer 21, the signal processor 23, and the display unit 25. The sensor signal processor 21 acquires the sensor signals indicating the contents detected by the radar antenna 11. The signal processor 23 performs the first signal processing by the first signal processing module 51 and the second signal processing by the second signal processing module 52 on the sensor signals acquired by the sensor signal acquirer. The display unit 25 displays the first information after the first signal processing on the display screen in a display mode, and displays the part of the second information after the second signal processing that is different from the first information on the display screen in a display mode different from the first information (in this embodiment, in a different display color).

In this manner, the main radar image (first information) and the supplemental radar image (second information) can be displayed simultaneously. Therefore, even if echoes in the first information are partially not displayed because of the gain adjustment processing, echoes in the second information corresponding to the part of the first information can be displayed instead. Therefore, for example, when the target object (i.e., the ship) is not displayed on the display screen, it can be prevented that the operator is confused whether the ship is not displayed only because of the signal processing or originally does not exist.

As above, the suitable embodiment of the present invention is explained. The above configuration may be modified as follows, for example.

The first and second information may be displayed in any arbitrary display mode as long as the display mode of displaying the information on the display unit 25 is different therebetween. For example, the display mode for the first information may be changed in saturation or brightness of color according to the signal level, and the second information may be displayed in a translucent or hatched manner. Note that, because the first and second information are obtained through the signal processing by the signal processor 23, the mode of displaying images thereof are not limited to the above embodiment.

The method of creating the sensor image by the image processor 24 is arbitrary as long as the first information is displayed as the main image and the part other than the first information are supplemented by the second information.

The present invention may be applied to other radar apparatuses installed in other kinds of movable bodies (e.g., aircrafts), and radar apparatuses installed in fixed bodies (e.g., a lighthouse) for observing a location of a movable body, in addition to the ship radar apparatus. Further, the present invention may be applied to sonar apparatuses for detecting positions of fish and sea bottom by using a sonic wave transceiving device for transceiving ultrasonic waves, other than the radar apparatus. Moreover, the present invention may be applied to a light measuring device (e.g., spectrometer) for measuring an intensity of each wavelength of light. Thus, the present invention may be applied to various kinds of equipments for performing signal processing on contents detected by a sensor.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An information display device, comprising:
 a sensor signal acquirer configured to acquire a sensor signal detected by a sensor;
 a signal processor configured to perform first signal processing on the sensor signal to generate first information, and configured to perform second signal processing, different from the first signal processing, on the sensor signal to generate second information, the first and second signal processing being different from each other in that a similar kind of signal processing is used in the first signal processing and the second signal processing, and parameters used in the first signal processing and the second signal processing are different from each other, with one of the parameters of the first and second signal processing being adjusted automatically, and the other parameter is adjusted based on a value set by an operator;

an image processor configured to combine the first information and a part of the second information that is different from the first information to create a sensor image; and a display unit configured to display the sensor image on a screen image, such that the first information and the second information are displayed simultaneously with the second information being displayed in a different display mode from the first information.

2. The information display device of claim 1, wherein the first information is displayed with gradation in color, and the second information is displayed with no gradation in color.

3. The information display device of claim 1, wherein a display color of the first information is different from a display color of the second information.

4. The information display device of claim 1, wherein the first signal processing corresponds to the second signal processing with additional processing.

5. The information display device of claim 1, wherein the similar kind of the signal processing is gain adjust processing.

6. The information display device of claim 1, wherein the similar kind of the signal processing is scan-to-scan correlation processing.

7. The information display device of claim 1, wherein one of the parameters of the first and second signal processing is a value obtained by either one of increasing and reducing the other parameter by a predetermined amount.

8. A radar apparatus, comprising:
a radar antenna serving as a sensor;
a sensor signal acquirer configured to acquire a sensor signal detected by the sensor;
a signal processor configured to perform first signal processing on the sensor signal to generate first information, and configured to perform second signal processing, different from the first signal processing, on the sensor signal to generate second information, the first and second signal processing being different from each other in that a similar kind of signal processing is used in the first signal processing and the second signal processing, and parameters used in the first signal processing and the second signal processing are different from each other, with one of the parameters of the first and second signal processing being adjusted automatically, and the other parameter is adjusted based on a value set by an operator;

an image processor configured to combine the first information and a part of the second information that is different from the first information to create a sensor image; and a display unit configured to display the sensor image on a screen image, such that the first information and the second information are displayed simultaneously with the second information being displayed in a different display mode from the first information.

9. A method of displaying information, comprising:
acquiring a sensor signal detected by a sensor;
performing first signal processing on the sensor signal to generate first information, and performing second signal processing, different from the first signal processing, on the sensor signal to generate second information, the first and second signal processing being different from each other in that a similar kind of signal processing is used in the first signal processing and the second signal processing, and parameters used in the first signal processing and the second signal processing are different from each other, with one of the parameters of the first and second signal processing being adjusted automatically, and the other parameter is adjusted based on a value set by an operator;

combining the first information and a part of the second information that is different from the first information to create a sensor image; and displaying the sensor image on a screen image, such that the first information and the second information are displayed simultaneously with the second information being displayed in a different display mode from the first information.

10. The method of claim 9, wherein the first information is displayed with gradation in color, and the second information is displayed with no gradation in color.

11. The method of claim 9, wherein a display color of the first information is different from a display color of the second information.

12. The method of claim 9, wherein the similar kind of the signal processing is gain adjust processing.

13. The method of claim 9, wherein the similar kind of the signal processing is scan-to-scan correlation processing.

14. The method of claim 9, wherein one of the parameters of the first and second signal processing is a value obtained by either one of increasing and reducing the other parameter by a predetermined amount.

* * * * *